(12) United States Patent
Rappaport et al.

(10) Patent No.: US 9,836,538 B2
(45) Date of Patent: Dec. 5, 2017

(54) DOMAIN-BASED RANKING IN DOCUMENT SEARCH

(75) Inventors: Alain Thierry Rappaport, Woodside, CA (US); Daniel Adamson, Toronto (CA)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1193 days.

(21) Appl. No.: 12/397,314

(22) Filed: Mar. 3, 2009

(65) Prior Publication Data

US 2010/0228743 A1 Sep. 9, 2010

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| | | | | |
|---|---|---|---|---|
| 6,269,153 B1* | 7/2001 | Carpenter | ............. | H04M 1/645 379/88.02 |
| 6,584,468 B1* | 6/2003 | Gabriel | ............. | G06F 17/30864 |
| 7,272,597 B2 | 9/2007 | Chowdhury et al. | | |
| 2002/0129015 A1* | 9/2002 | Caudill | ............... | G06F 17/3069 |
| 2002/0169764 A1* | 11/2002 | Kincaid | ............. | G06F 17/30713 |
| 2004/0034633 A1* | 2/2004 | Rickard | ............ | G06F 17/30864 |
| 2004/0254911 A1* | 12/2004 | Grasso | .............. | G06F 17/30011 |
| 2006/0026205 A1* | 2/2006 | Butterfield | .......... | G06F 19/3456 |
| 2007/0011155 A1* | 1/2007 | Sarkar | ................ | G06F 17/30722 |
| 2007/0100817 A1* | 5/2007 | Acharya | ........... | G06F 17/30864 |
| 2008/0086467 A1 | 4/2008 | Crumb et al. | | |
| 2008/0104004 A1 | 5/2008 | Brave et al. | | |
| 2008/0104049 A1* | 5/2008 | Richardson | ....... | G06F 17/30864 |
| 2008/0140616 A1* | 6/2008 | Encina | ............. | G06F 17/30864 |
| 2008/0183699 A1* | 7/2008 | Hu | .................... | G06F 17/30864 |

(Continued)

FOREIGN PATENT DOCUMENTS

WO 2007124430 A2 11/2007

OTHER PUBLICATIONS

Ziming Zhuang; Re-Ranking Search Results Using Query Logs; 2006; CIKM; pp. 860-861.*

(Continued)

*Primary Examiner* — Mariela Reyes
*Assistant Examiner* — Jermaine Mincey

(57) ABSTRACT

In one example, documents that are examined by a search process may be scored in a manner that is specific to a domain. A domain may be a substantive area, such as medicine, sports, etc. Different scoring approaches that take aspects of the domain into account may be applied to the documents, thereby producing different scores than might have been produced by a simple comparison of the terms in the query with the terms in the documents. These domain-based approaches may take a query into account in scoring the documents, or may be query-independent. Each approach may be implemented by a scorer. The combined output of the scorers may be used to generate a score for each document. Documents then may be ranked based on the scores, and search results may be provided.

20 Claims, 6 Drawing Sheets

(56) References Cited

U.S. PATENT DOCUMENTS

| | | | | |
|---|---|---|---|---|
| 2008/0201348 | A1* | 8/2008 | Edmonds | G06Q 30/02 |
| 2008/0243838 | A1* | 10/2008 | Scott | G06F 17/30864 |
| 2008/0301117 | A1* | 12/2008 | Zeng | G06F 17/30864 |
| 2008/0306943 | A1* | 12/2008 | Patterson | G06F 17/30864 |
| 2009/0024605 | A1* | 1/2009 | Yang | G06F 17/30873 |
| 2009/0048925 | A1* | 2/2009 | Song | G06Q 30/0254 705/14.52 |
| 2009/0049017 | A1* | 2/2009 | Gross | G06F 17/30867 |
| 2009/0119261 | A1* | 5/2009 | Ismalon | G06F 17/3064 |
| 2009/0125505 | A1 | 5/2009 | Bhalotia et al. | |

OTHER PUBLICATIONS

Dickmeiss, et al.,"Zebra—User's Guide and Reference", Retrieved at <<http://www.indexdata.dk/zebra/doc/zebra.pdf>>, Nov. 6, 2008, 161 pages.

Baid, et al.,"DBPubs: Multidimensional Exploration of Database Publications", Retrieved at <<http://www.vldb.org/pvldb/1/1454199.pdf>>, PVLDB '08, Aug. 23-28, 2008, Auckland, New Zealand, ACM, pp. 1456-1459.

Kumar Jayant, "Document Scoring/Calculating Relevance in Lucene", Retrieved at <<http://jayant7k.blogspot.com/2006/07/document-scoringcalculating-relevance_08.html>>, Jul. 8, 2006, 16 pages..

Yan, et al., "Document Re-ranking by Generality in Bio-medical Information Retrieval", Retrieved at <<http://www.springerlink.com/content/p1u8j13026301h40/>>, WISE 2005, LNCS 3806, 2005, pp. 376-389.

Kamps, et al., "Evaluating Relevant in Context: Document Retrieval with a Twist ", Retrieved at <<http://hal.archives-ouvertes.fr/docs/00/17/41/40/PDF/sigir07aic.pdf, SIGIR'07, Jul. 23-27, 2007, Amsterdam, The Netherlands, 2 pages.

Bendersky, et al., "Re-Ranking Search Results using Document-Passage Graphs", Retrieved at <<http://iew3.technion.ac.il/~kurland/docPsgGraph.pdf>>, SIGIR'08, Jul. 20-24, 2008, Singapore, ACM, 2 pages.

Buntine, et al., "Topic-Specific Scoring of Documents for Relevant Retrieval", Retrieved at <<http://eprints.pascal-network.org/archive/00001247/01/buntineLWS.pdf>>, Learning in Web Search, at the 22nd International Conference on Machine Learning, Bonn, Germany, 2005, 8 pages.

Abiteboul, et al., "Adaptive On-Line Page Importance Computation", Retrieved at <<http://www2003.org/cdrom/papers/refereed/p007/p7-abiteboul.html>>, WWW2003, May 20-24, 2003, Budapest, Hungary, ACM, 17 pages.

Scarselli, et al., "Adaptive Page Ranking with Neural Networks", WWW 2005, May 10-14, 2005, Chiba, Japan, ACM, pp. 936-937.

Brin, et al., "The Anatomy of a Large-Scale Hypertextual Web Search Engine", retrieved at <<http://infolab.stanford.edu/~backrub/google.html>>, dated: 1998, 20 pages.

"Apache Lucene—Scoring", dated 2006, pp. 1-6.

Jadid, et al., "Application of Neural Network for Contingency Ranking Based on Combination of Severity Indices", Proceedings of World Academy of Science, Engineering, and Technology, vol. 5, Apr. 2005, pp. 225-228.

"FieldScoreQuery (Lucene 2.2.0 API)", Retrieved at <<http://lucene.apache.org/java/2.2.0/api/org/apache/lucene/search/function>>, retrieved on: Feb. 10, 2009, dated: 2000-2007, 2 pages.

"Similarity (Lucene 2.2.0 API)", Retrieved at <<http://lucene.apache.org/java/2.2.0/api/org/apache/lucene/search/Similar>>, retrieved on: Feb. 10, 2009, dated: 2000-2007, 7 pages.

Burges, et al., "Learning to Rank using Gradient Descent", Appearing in Proceedings of the 22nd International Conference on Machine Learning, Bonn, Germany, 2005, 8 pages.

"Vector space model", Retrieved at http://en.wikipedia.org/wiki/Vector_Space_Model>>, retrieved on: Feb. 10, 2009, last modified date: Jan. 4, 2009, 2 pages.

Rogers, Ian, "The Google Pagerank Algorithm and How It Works", Retrieved at<<http://www.ianrogers.net/google-page-rank/>>, retrieved on: Feb. 10, 2009, dated: 2002, 13 pages.

* cited by examiner

DOMAIN-BASED RANKING IN DOCUMENT SEARCH

BACKGROUND

A document search involves determining which documents are relevant to a query. Traditionally, the search process starts with a query and a corpus of documents, and compares the words in the query with the words in a document. A scoring algorithm assigns scores to the documents in the corpus based on which words in the query appear in the various documents, and with what frequency. The documents are then ranked based on their scores, and the results of the search are presented.

However, a simple comparison of words in the query with words in the document often leads to unsatisfactory results. The significance of some words may be ambiguous—e.g., in English, "cold" may refer to an illness or a weather condition. If a query contains this word, then scoring documents based on how frequently the word "cold" appears in each document is likely to identify some documents that relate to winter weather and others that relate to rhinovirus.

Search systems that focus on comparing words in a query with words in a document often fail to identify documents that contain the type of subject matter that a searcher is looking for. There may be cues that would guide the search system to the right document, but these cues are often ignored.

SUMMARY

A search may be performed in a way that takes into account whether the document is in the same domain as the one in which the search is being performed. A domain may be, for example, a substantive area in which one might want to search—e.g., medicine, sports, etc. Each document may receive one or more domain-based scores that are based on how well the document fits into a particular domain in general, or how well the document discusses the part of the domain which is related to the query. Each document may also receive a term-based score based on how many terms the document has in common with the query. The document's term-based score may be combined with the one or more domain-based scores. Results of a search may be presented based on the domain-based score(s), or based on a combination of the domain-based score(s) and other scoring approaches such as term-based and/or popularity-based scores.

For example, a search could be performed in a particular application (e.g., a web application) that caters to a specific domain, such as medicine. The search query might be "common cold". Given some corpus of documents, the documents may receive a term-based score that is based on how well the terms in the documents fit the query. The term-based scoring algorithm will likely assign high scores to many English-language documents about "cold" as an illness, but will also likely assign high scores to some English-language documents about common cold weather fronts, cold-air intakes that are common for auto racing, common themes in the Cold War, etc. However, various domain-based scoring algorithms may be used, which may assign scores to documents based on how well those documents fit the medical domain. Thus, documents that contain many medical concepts may receive higher domain-based scores than documents that contain few or no medical concepts.

There are various different ways to calculate a domain-based score for a document, some that take the query into account and some that are independent of the query. For example, in the medical domain, documents could receive a domain-based score based on the number of medical terms the document contains, and that score could be assigned without regard to any particular query. As another example, the document could be assigned a domain-based score based on how well the set of medical concepts in the query matches the set of medical concepts in the document. The latter domain-based scoring technique is an example of a technique that does take the query into account. Several different domain-based scoring techniques could be used, and these techniques could be combined in some manner to achieve an overall score for the document. In calculating the overall score, the domain-based scores could be combined with a term-based score as well as other scoring methodologies (such as popularity-based measures).

In some cases, the search is performed in a situation from which the relevant domain reasonably can be inferred. For example, a search on a medicine-oriented web site might be inferred to be in the medical domain, a search on a sports web site might be inferred to be in the sports domain, etc. However, in some cases, the domain of the search might not be inferred, so the query could be evaluated in several different domains. For example, in a general search engine a search for "cold" could be performed. Since "cold" might refer to a weather condition or a disease, documents could be scored both for the medical domain and for the weather domain. Different sets of results, representing the scores in the different domains, could be presented to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
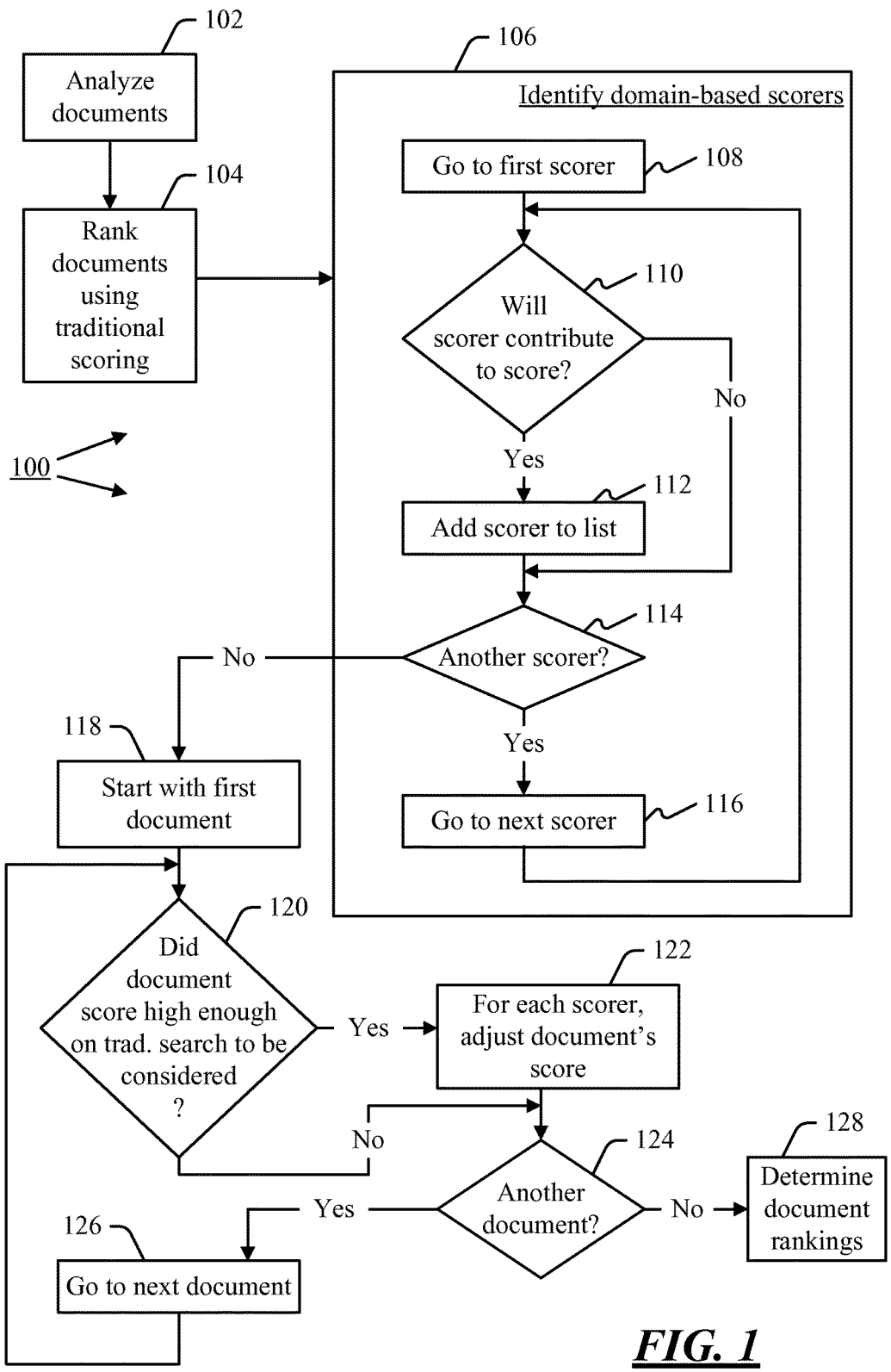
FIG. 1 is a flow diagram of an example process in which a query may be evaluated.

A search system compares a query to a corpus of documents, and determines which document(s) satisfy the query. The query is typically compared to the document on a term-by-term basis. Terms in the query and the document may be lemmatized in order to convert the terms into normal form (e.g., "rides," "riding," and "ridden" may all be converted to the normal form "ride"). The normal forms may then be compared to determine which document(s) contain terms that the query contains. Depending on the applicable search criteria, documents may be selected that contain at least one term in the query, all the terms in the query, at least some percentage of the terms in the query, etc. In Boolean search systems, this technique sorts a document into two sets: those that match the query and those that do not. Since there may be thousands or millions of documents that match the query, simply providing a list of documents that match is typically too coarse a result to be helpful to a user. Therefore, search systems assign scores to matching documents, where the scores attempt to capture the relevance, to the query, of each matching document.

Typical term-based scoring systems assign scores based on statistics concerning the frequency with which query terms appear in a matching document. For example, a large number of occurrences of the query term in the document may increase the document's score. The co-occurrence of a rare term in both the query and the document may also increase the document's score. The occurrence of many terms in the document that do not appear in the query may decrease the document's score (because the presence of non-query terms may suggest that the document is not all that relevant to the query, even if the document contains all of the query's terms). A document could receive an increase in score if a query term appears in a particular place within the document—e.g., in the document's title or abstract.

"Traditional" scoring techniques include term-based scoring techniques and popularity-based techniques. Common term-based techniques include term vector space modeling. Common popularity-based techniques include using the links between documents (such as hyperlinks in web pages) as well as citation links, such as in the academic community where papers are referenced. Popularity-based techniques would also include recording which search results are popular with users. While traditional scoring techniques can be effective, they have their limitations. In particular, there may be some information that is not part of the query itself, but nonetheless suggests what a user is looking for. For example, if the user makes a search request on a healthcare-related web site, this fact may suggest that the user is looking for documents related to health or medicine. Thus, if the user types the English word "cold" into a general-purpose search engine, it may not be possible to disambiguate whether the user is looking for information about rhinovirus or winter temperatures. On the other hand, if the user types the word "cold" into a search engine on a healthcare web site, it is possible to infer that the user is talking about "cold" the disease rather than "cold" the weather condition. Thus, with such knowledge about the user's query, documents that use the term "cold" to refer to the disease may score higher than documents that use the term "cold" to refer to the weather condition.

However, even if one can infer, from the context in which the search is being performed that the user is looking for information about "cold" the disease instead of "cold" the weather condition, the scoring algorithm may not respond to the query effectively if the scoring algorithm does not have some way to determine which documents refer to "cold" the disease, and which ones refer to "cold" the weather condition. However, if it could be determined that a document relates to the medical domain rather than the weather domain, then the document from the medical domain could be given a scoring edge, on the theory that —when the term "cold" appears in a medical document—the document is highly likely (or at least somewhat likely) to be referring to "cold" the disease. Thus, as between two documents that have similar occurrence of the word "cold", the document in the medical domain would appear higher in the final results than the document in the weather domain. These results may align more closely with what the user is looking for than would results that are based on a simply count of how frequently the term "cold" appears in the various documents. This domain knowledge may be used in a classification approach to make a binary classification of documents as, for example, "medical" or not.

Within a given domain, various types of analysis may be performed to increase or decrease a document's score. As one example, a given domain may be associated with various concepts—e.g., a medical domain may be associated with concepts like "cold", "flu", "cancer", "heart disease", "drug side effects", etc. If the query contains some subset of the domain's concepts and the title of a document contains the same subset of the domain's concepts, then the document may be considered to be particularly relevant to the query. Or, as another example, the number of domain-related concepts in the document could be counted and the document could be penalized if the number of concepts falls outside a certain range. (Too few concepts may suggest the document is of no relevance to the domain; too many concepts may indicate that the document is about such a diffuse set of topics that the document has little value to any one topic.) Domain-based analyses may be dependent on a query or independent of a query. The above example in which concepts in the title of a document are compared with the concepts in a query is an example of a domain-based analysis that is dependent on a query. On the other hand, counting the number of concepts that appear in a document and penalizing the document for having too many or too few concepts is an example of an analysis that can be performed independent of a query.

Documents may be scored on a combination of traditional scoring techniques and domain-based criteria, and results may be returned based on a combined score. The documents may be scored in several domains (e.g., if there is some ambiguity about the domain to which the query relates), and a different set of search results could be provided for each domain.

It is noted that documents may include any type of information in any form. For example, a document may be an electronic record or other collection of text. Such a document may be represented in a database as one or more records, or in a content management system, or other electronic format. For example, in the health context, documents may include consumer web pages, professional articles, hospital records, discharge documents, etc.

Many of the examples herein refer to searches performed in the medical domain, where the medical domain may, for example, contain information that is descriptive of a human body, or that is descriptive of treatments of the human body. However, a domain could represent any substantive field of knowledge, and searches could be performed in any domain. For example, there could be domains for sports, cars, food, education, or any other area. Domains could be at any level of granularity—e.g., "sports" could be a domain, but so could "baseball" or "hockey."

Turning now to the drawings, FIG. 1 shows an example process 100 in which a query may be evaluated. Before turning to a description of FIG. 1, it is noted that each of the flow diagrams contained herein (both in FIG. 1 and in FIGS. 5-7) shows an example in which stages of a process are carried out in a particular order, as indicated by the lines connecting the blocks, but the various stages shown in these diagrams can be performed in any order, or in any combination or sub-combination.

Process 100 may be performed on a corpus of documents with respect to some query that a user has submitted. At 102, documents in the corpus are analyzed. A result of this analysis is to score the documents against the input query, and to rank the documents using a traditional scoring system (at 104). The Lucene library, provided by the Apache Software Foundation, is one example of a system that could be used to implement and perform term-based scoring, although any type of traditional scoring system could be used.

After the documents have been scored from a traditional perspective, one or more types of domain-based scoring may be identified at 106. For the description of FIG. 1, it is assumed that one or more domain-based scoring approaches exist. (Specific examples of such approaches are described below in connection with FIGS. 4-7.) These different approaches may score documents that are based on one or more aspects of a substantive domain—e.g., the kinds of concepts associated with the domain, the kinds of terms associated with that domain, etc. Each approach may be implemented by a "scorer". In one example, each scorer may determine whether it will, or will not, make a contribution to scoring the documents. Each scorer may make this determination based on whatever criteria the scorer implements (e.g., a particular scorer may decide that the query does not provide enough information for that scorer's algorithm to make a meaningful contribution to the final score). Thus, the sub-process performed at 106 loops through the various scorers to determine which scorers will contribute to the documents' final score.

The sub-process at 106 starts by considering a first one of the scorers (at 108). At 110, it is determined whether the scorer will contribute to the documents' scores. As noted above, the scorer may make this determination using any criteria, and typically reports whether it will or will not contribute. One example way that the scorer could report whether it will or will not contribute is to expose a function, which is callable by an entity external to the scorer. The function may return a Boolean value indicating whether the scorer will or will not contribute to the scoring. There are various circumstances that could lead a scorer to decide that it will, or will not, contribute to the scoring. For example, if a particular scorer performs a query-dependent scoring analysis, that scorer may find the query too vague to perform a meaningful analysis and thus may determine that it has nothing to contribute to the scoring of the documents. On the other hand, another scorer might implement a query-independent analysis, and thus may determine that it will contribute to scoring the documents. If it is determined at 110 that the current scorer will contribute to scoring the documents, then that scorer is added to a list of scorers (at 112). Otherwise, 112 is bypassed.

If there is another scorer (as determined at 114), then the process moves to the next scorer (at 116), and loops back to 110 to determine whether the next scorer will contribute to scoring the documents. When there are no more scorers to consider (as determined at 114), the process continues to 118.

From 118 on, process 100 uses the domain based scorers identified in sub-process 106 (i.e., those scorers that were added to the list at 112) to score the documents. For example, documents may have already received a traditional score (at 104), and the domain-based scorers may be used to modify the traditional score.

At 118, process 100 picks a first document as the current document to be considered by the scorers. If the current document received a high enough traditional score to merit further consideration (as determined at 120), then, at 122, each of the domain-based scorers identified in sub-process 106 may be used to adjust the score of the current document. (For example, there may be some minimum traditional score, below which documents are not included in the search rankings without regard to their domain-based score. Such a document might be excluded from further consideration by the determination made at 120.) If the current document did not receive a high enough score to merit further consideration, then 122 may be bypassed, and the document may be excluded from the final search results.

If there is another document to consider (as determined at 124), then at 126 the process goes on to the next document (which becomes the current document), and the process returns to 120 to apply domain-based scoring to the next document. If it is determined (at 126) that there are no more documents to consider, then the process continues to 128 to determine the final document rankings.

It is noted that FIG. 1 shows an example in which documents receive traditional scores and in which domain-based scores are used to adjust the traditional scores. However, it is also possible to score documents solely based on domain-based rankings. In such an example, documents would not receive a traditional score, and each document's final score could be determined by domain-based scorers alone.

Figure 2:
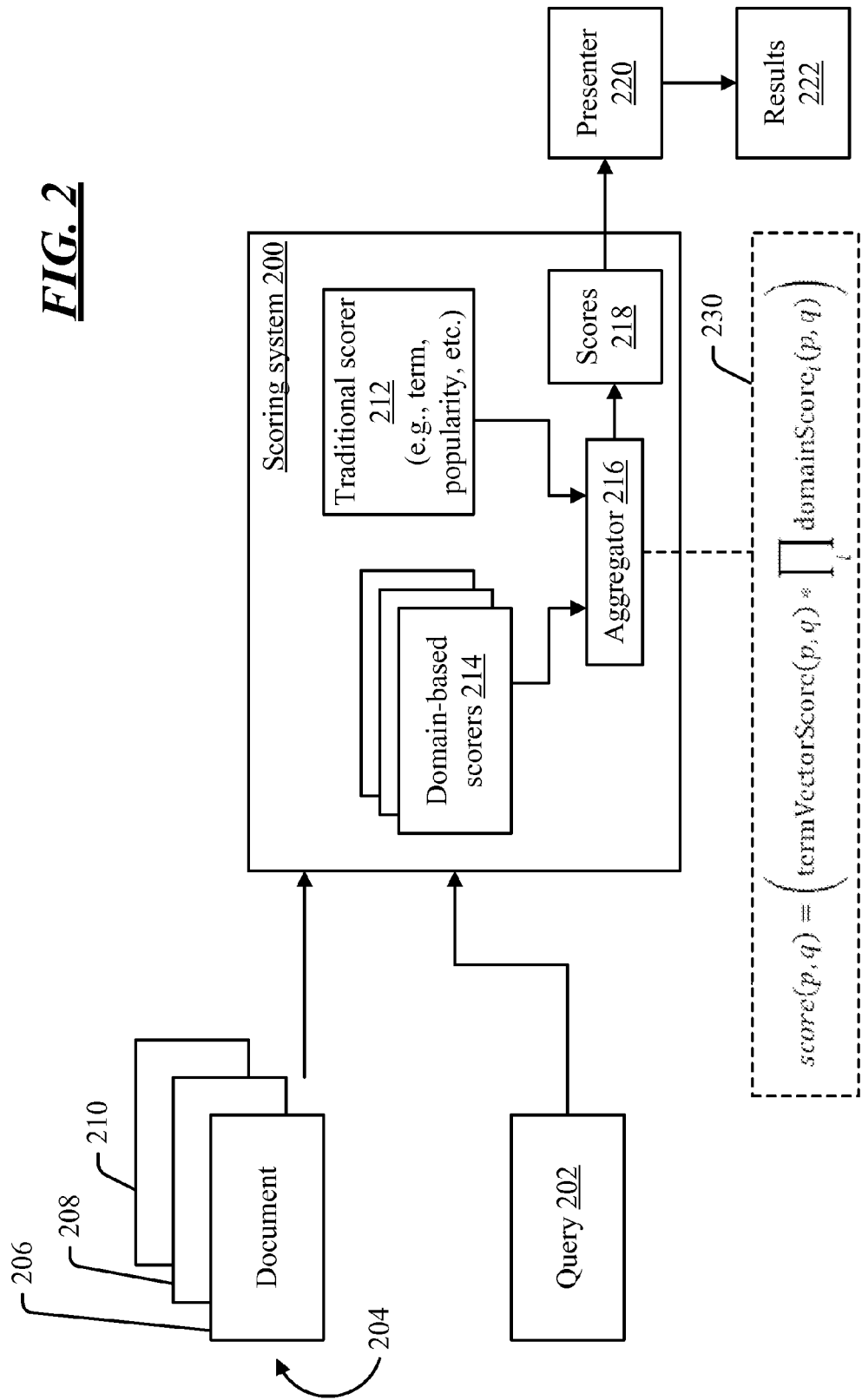
FIG. 2 is a block diagram of an example system that may be used to perform domain-based scoring of documents.

FIG. 2 shows an example scoring system 200 that may be used to perform domain-based scoring of documents.

Scoring system 200 may take, as input, query 202, and a corpus 204 of documents. In the example of FIG. 2, corpus 204 comprises three documents 206, 208, and 210, although the three documents shown are for illustration only, and corpus 204 could comprise any number of documents.

Scoring system 200 comprises a traditional scorer 212, and one or more domain-based scorers 214. For example, term-based scorer may perform a term-based analysis that performs a comparison of terms in query 202 with terms in documents in corpus 204. As noted above, terms in the query and the documents may be lemmatized so that the normal forms of these terms may be compared (and the notion of comparing "terms" in documents is not limited to comparing the literal terms, but also includes comparing the normalized forms of terms). Such lemmatization may be performed by term-based scorer 212. Term-based scorer 212 could implement any type of scoring algorithm.

Domain-based scorers 214 may implement domain-based scoring algorithms. As mentioned above, some examples of domain-based scoring algorithms are described in connection with FIGS. 4-7.

Aggregator 216 combines the various scores (the traditional score and the domain-based scores), and creates a set of final scores 218 for the documents. There are various ways to aggregate the scores for a document, but one example way is shown in formula 230, which is:

$$\text{score}(p, q) = \left( \text{termVectorScore}(p, q) * \prod_i \text{domainScore}_i(p, q) \right)$$

In this formula, p is a document, q is a query, termVectorScore is a traditional score as a function of p and q, and each of the domainScore$_i$ are the scores produced by the various domain-based scorers (which may be expressed as functions of p and q, although, as noted above, some of the algorithms implemented by these scorers are query-independent, in which case a given function may disregard the input q.) Formula 230 is merely one example way in which a final score could be calculated from the various different scores. As another example, the final score could be calculated as the sum of the various component scores. However, using a product, as in example formula 230, allows each score to have a strong impact on the final score (e.g., one domain-based score of 0.001 could have a strong impact on the final score, due to the use of that number in the calculation of a product), and also allows domain-based scores to be used to adjust traditional scores even if the range of traditional scores is not known to the domain-based algorithms. Thus, there may be a reason to use example formula 230 although, as noted above, any technique for combining the various scores could be used.

Scores 218 may be provided to a presenter 220. Presenter 220 may, for example, be a web application that provides a list of search results 222. For example, presenter 220 could assemble results 222, in some order, into the form of a Hypertext Markup Language (HTML) page, which may then be delivered to a user's web browser.

Figure 3:
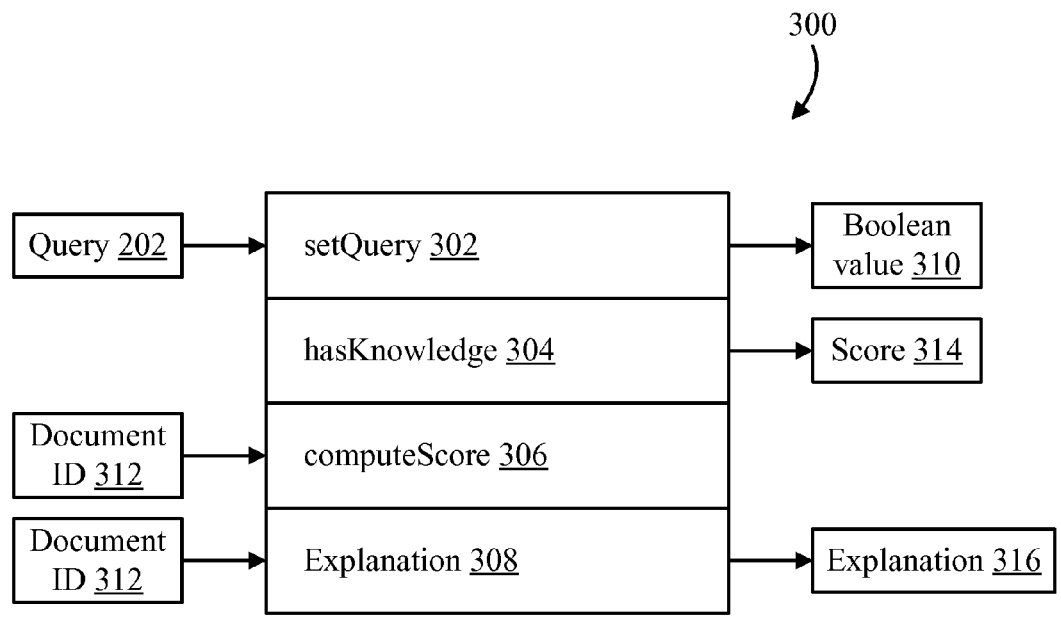
FIG. 3 is a block diagram of an example interface that may be exposed by a scorer.

As noted above, each of the domain-based scoring algorithms may be implemented by a scorer. Each scorer may be implemented as a discrete object (or other type of component), and the scorer may expose an interface to allow the scorer to interact with an overall scoring system. For example, scoring system 200 may interact with a scorer through the interface that the scorer exposes. FIG. 3 shows an example of such an interface 300.

Interface 300 may include functions such as setQuery 302, hasKnowledge 304, computeScore 306, and/or Explanation 308.

setQuery 302 is used to identify, to the scorer, the query against which documents are to be scored. setQuery 302 receives query 202 (or an identification of query 202) as input. As noted above, some scorers produce a domain-based score that is independent of any particular query. In such a case, the call to setQuery 302 may be omitted.

hasKnowledge 304 indicates whether the scorer will issue a score based on the query that has been set. For example, as noted above, some scorers may find that a particular query is vague or indecipherable, and thus may decline to offer a score based on that query. Thus, after setQuery 302 has been called to identify the query against which documents are to be scored, the scoring system may call hasKnowledge 304 to determine whether the scorer will offer a score based on the queries. For example, as described above in connection with FIG. 1, a process may go through the various domain-based scorers one-by-one and may construct a list of those scorers that will contribute to the score. hasKnowledge 304 may be used by such a process to identify which scorers will contribute a score. Each scorer uses its own criteria to decide whether it will contribute to the scoring of documents, and thus each scorer may implement its own version of hasKnowledge 304. hasKnowledge 304 returns a Boolean value 310—e.g., "true" if the scorer will score the documents against the query, "false" if it will not.

computeScore 306 calculates and returns a document's score. computeScore 306 receives an document identifier 312, which identifies a particular document in the relevant corpus. computeScore 306 returns a score 314 for that document. The score 314 may be used as input to some aggregation formula (e.g., example formula 230, shown in FIG. 2). Each scorer implements its own version of computeScore 306, depending on the particular scoring algorithm executed by that scorer. If the scorer implements a query-dependent algorithm, then computeScore 306 may be implemented as a function that takes into account the query that was identified through a call to setQuery 302. Or, if the scorer implements a query-independent algorithm, then computeScore 306 may carry out a function that does not take the query into account.

Explanation 308 is a function that may be used to provide an explanation 316 of the score that has been assigned to a given document. The function Explanation 308 may take a document identifier 312 as input, and may provide an explanation 316 (e.g., in the form of a character string) as output. The character string may contain a description of the reason for which a particular document received a particular score.

Figure 4:
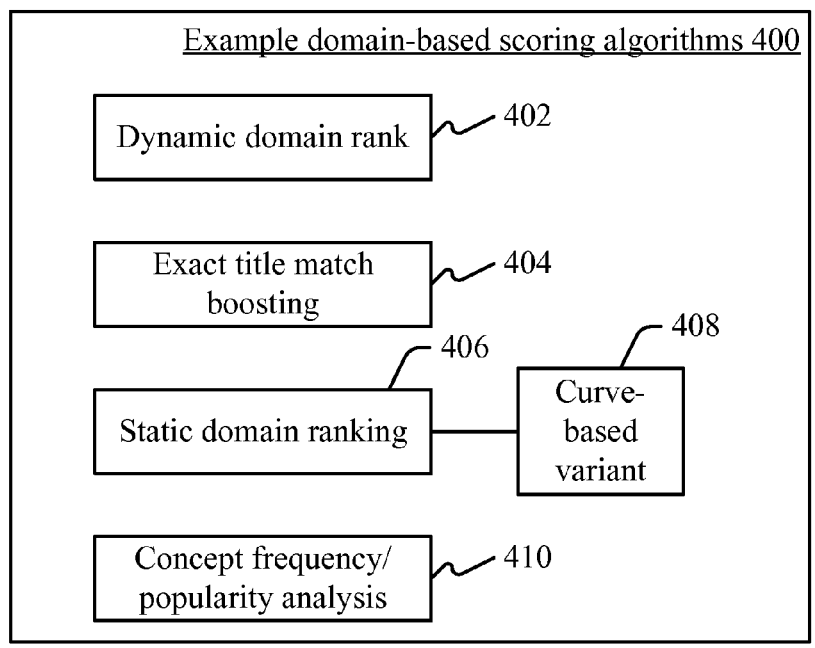
FIG. 4 is a block diagram of some example domain-based scoring algorithms.

As noted above, the various domain-based scorers may implement various types of scoring algorithms. FIG. 4 shows some example domain-based scoring algorithms 400.

Figure 5:
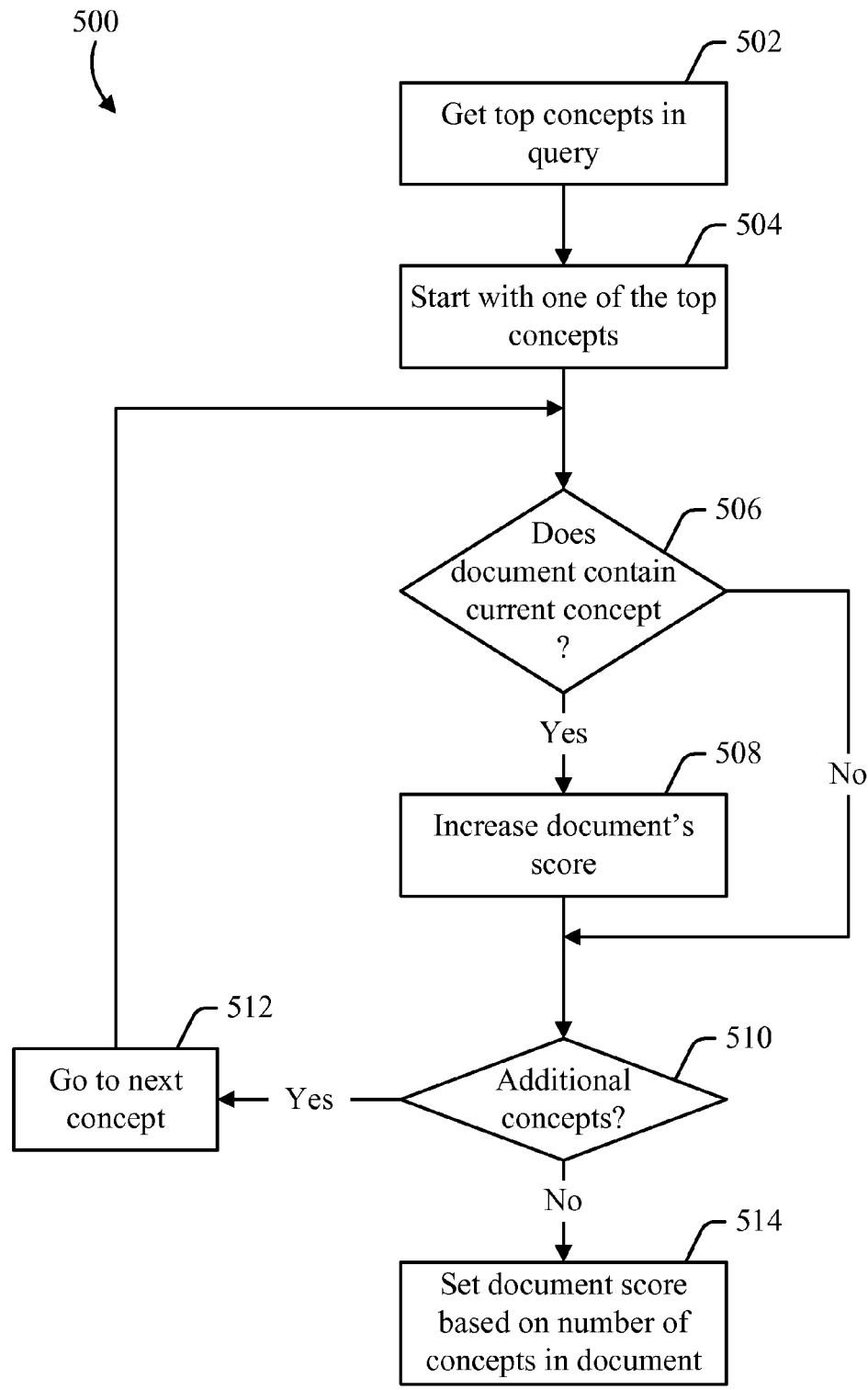
FIG. 5 is a flow diagram of an example process of generating a dynamic domain rank score.

One example of a domain-based scoring algorithm is dynamic domain rank 402. In dynamic domain rank 402, the scorer looks at the query and determines the top concepts related to the terms in the query. (What constitutes the "top" concepts could be defined in any manner—e.g., the top concepts could be specified by a person, or could be derived from a statistical analysis of documents.) For example, if the query contains the term "breast cancer", it might be determined that the top concepts associated with that term are "chemotherapy," "radiation," and "HERCEPTIN" (a brand of drug that is used in the treatment of breast cancer). Therefore, dynamic-domain rank 402 may boost the score of a document that contains these concepts. Dynamic-domain rank 402 may also have an "anti-spam" provision, which penalizes a document for containing too many concepts—even if the document contains the top concepts for the query terms. (The theory behind this penalty is that documents that contain too many concepts may be too diffuse or unfocused to be relevant to any one issue.) A flow chart showing an example implementation of dynamic domain rank 402 is shown in FIG. 5, and is discussed below.

Figure 6:
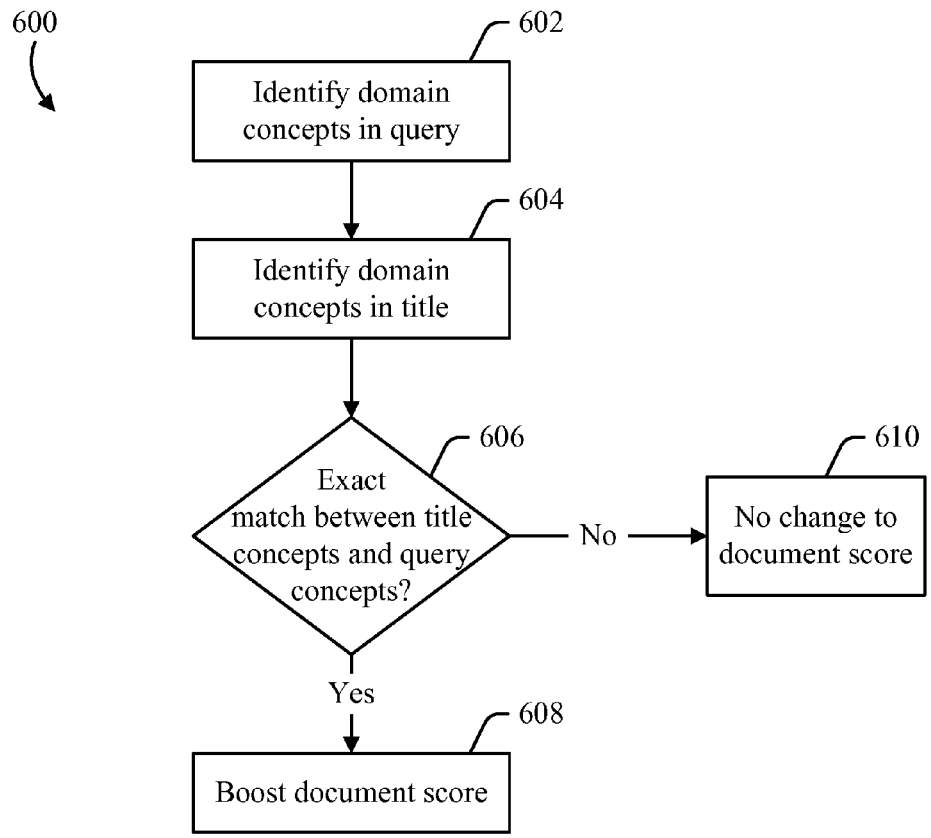
FIG. 6 is a flow diagram of an example process of performing exact title match boosting.

Another example of a domain-based scoring algorithm is exact title match boosting 404. In exact title match boosting 404, the query is evaluated to determine what concepts it contains, and the title of a document is likewise evaluated to determine what concepts that title contains. If the set of concepts in the query is identical to the set of concepts in the title (that is, if the title contains exactly the same concepts as the query—no more, no less), then the document's score may be boosted. In greater generality, it may be determined whether the set of concepts in the title and in the query satisfy some defined level of similarity (where an identical match is one example of a such a defined level of similarity, although other notions of similarity could be used, such as a match that allows the title and the query to differ by up to some specific number of concepts). Exact title match boosting 404 is based on the theory that the title may be particularly descriptive of the content of the document, and thus a close consonance between the query and the title may indicate that a document is particularly relevant. A flow chart showing an example implementation of exact title match boosting 404 is shown in FIG. 6, and is discussed below. The concept of exact title match boosting 404 may be applied using material that summarizes the document, of which the title is an example. In general, the principles of exact match (or of matching within a defined level of similarity) may be applied to any type of summary—e.g., the title, the abstract, a machine-generated extract of the document, etc.

Figure 7:
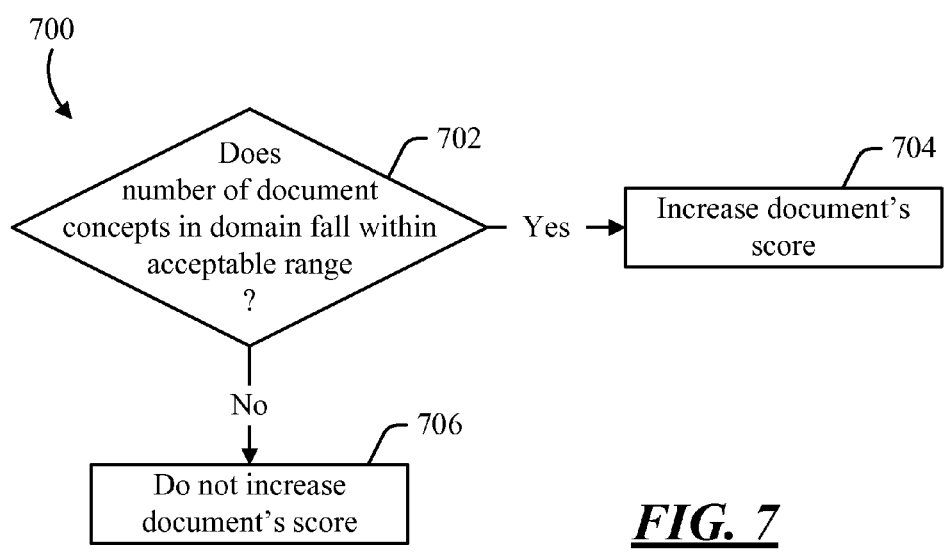
FIG. 7 is a flow diagram of an example process of performing static domain ranking.

Another example of a domain-based scoring algorithm is static domain ranking 406. Static domain ranking 406, which is an example of a query-independent scoring algorithm, seeks to determine the relevance of a document to a domain, based on the presence or absence of certain concepts. For example, a document in the medical domain is likely to contain some number of drug names. Therefore, the fact that a document contains no drug names may suggest that the document is not relevant to the medical domain, so the score of such a document could be decreased. Conversely, if a document contains two hundred drug names, it may be inferred that the document speaks to such a diffuse set of topics as to be of little relevance to answering a query about one specific medical topic, so the score of such a document could be decreased. A document in a particular domain might be assumed to meet some profile. For example, it might be assumed that a medical document that is valuable in answering a query on a particular medical issue might mention five to twenty drug names, and one to five disease names. If static analysis reveals that the content of the document falls within these ranges, then the score of such a document could be increased, and if the document falls outside of these ranges, the score could be decreased. In one example, documents simply receive a fixed increase (or decrease) in score for falling inside (or outside) of acceptable ranges. A flow chart showing an example implementation of static domain ranking 406 is shown in FIG. 7, and is discussed below.

There is a curve-based variant 408 of static domain ranking, in which the acceptable number of concepts in the document (e.g., the acceptable number of drug names, the acceptable number of disease names, etc.) is modeled as a Gaussian bell curve. In such a model, rather than using a binary yes/no decision about whether to increase (or decrease) a document's score by a fixed amount, the amount of the score increase (or decrease) is variable and depends on where the concept count falls along the curve. So, for example, if the median number of drug names that appear in a document is ten, then—in a plot of drug-name count (on the horizontal axis) and score increase (on the vertical axis)—a count of ten drug names would be the peak of a curve, and documents that have exactly ten drug names would receive the maximal score increase. Documents that have some other number of drug names could receive a lower score increase, based on where that count of drug names falls on the curve. Thus, a document that has ten drug names might receive a score in increase of one-hundred; a document that has nine or eleven drug names might receive a score increase of ninety; and so on.

Yet another example of a domain-based scoring algorithm is concept frequency analysis 410. In this analysis, a document's score may be increased if the document refers to concepts that are particularly popular in the domain. A corpus of documents could be canvassed to determine the relative frequency in those documents of concepts related to the domain. For example, a canvas of medical documents might determine that "diabetes" is a frequently-occurring concept, and "progeria" is concept that appears relatively rarely. Since many searches in a domain are for common concepts, a document's score could be boosted if the document refers to frequent concepts, and could be reduced if the document refers to infrequent concepts.

It is noted that the above discussion refers to both increasing and decreasing a document's score, depending on the result of a domain-based scoring algorithm. However, scores may be viewed as being relative, and thus an algorithm could achieve the same effect by: (a) increasing scores of documents that the algorithm perceives a more relevant to the domain, (b) decreasing scores of documents that the algorithm perceives as less relevant to the domain, or (c) doing both. For example, consider the case of exact title match boosting 404. That algorithm determines whether a query and the title of a document contain exactly the same set of domain-related concepts. The algorithm presumes that an exact concept match between the title and the query indicates the document is particularly relevant, and thus may attempt to cause documents whose title is an exact concept match with the query to have higher scores than similar documents whose title does not have an exact concept match with the query. In order to accomplish this adjustment to document scores, the algorithm could increase the score of documents whose title has an exact concept match with the query, or could decrease the scores of documents whose title does not exhibit an exact concept match with the query, or could do both. It makes no difference which score adjustment technique is employed as long as the relative scores of the documents are changed. Thus, the subject matter herein may be understood to encompass any of these techniques.

It is noted that the example of using a title field is one reasonable usage of this technique, but the comparison could be performed using any other content, such as a summary field(s) or abstract field(s). The content being used could be provided by the publisher of the document, could be part of the document itself, or created algorithmically, such as by using a summarization algorithm.

This domain-based comparison of the query and the content is performed at the concept level, making this approach different (and often more accurate) than a simple term-based matching or traditional scoring approach.

FIG. 5 shows an example process 500 of generating a dynamic domain rank score. At 502, process 500 gets the top concepts related to the terms in a query. For example, as noted above, if the query contains the term "breast cancer," then the top concepts might be "chemotherapy," "radiation," and "HERCEPTIN". The top concepts may be chosen in any manner (e.g., the top concepts may be those that occur with the highest frequency within a corpus of documents, the top concepts may be chosen by a person, or any other technique may be used to choose the top concepts). Typically, what constitutes a top concept might be dependent on the domain. For example, in the medical domain, the top concepts related to the term "cold" might be "decongestant," "fever," and "headache," while in the weather domain the top concepts related to the same term might be "snow," "ice," and "wind chill."

Process 500 then proceeds to determine, concept-by-concept, which of the top concepts for the query terms are present in the document. Process 500 starts with one of the top concepts for the query terms (at 504), and then determines (at 506) whether the document under consideration contains the concept. If the document does contain the concept, then the score for that document is increased (at 508). The amount that the document's score increases may change based on the number of concepts that have already been found. An example implementation of this principle is described below in connection with Table 1.

If there are additional concepts to consider (as determined at 510), then process 500 moves to the next concept (at 512), and then returns to 506 to determine whether the document contains the next concept. If there are no more concepts to consider, then the document's score is set (at 514) based on the number of concepts (from among those identified at 502) that appear in the document. The document's score may be penalized in some manner if the document contains too many concepts, since too many concepts in the document may indicate that substance of the document is too diffuse to be relevant to any particular topic. An example of how to implement this penalty is described in connection with Table 1.

Table 1 shows example pseudo-code, which describes an example implementation of process 500.

TABLE 1

```
float score = 0;
int pos = 0;
for (Integer conceptId : topQueryConceptIds){
    if (contentConcepts.contains(conceptId)){
        float addon = startingScore - pos * decrementConstant;
        if (addon < minimumScore){
            addon = minimumScore;
        }
        score = score + addon;
    }
    pos++; //increment regardless of hitting or not.
}
float finalScore = 1 + score / (1 +
    contentConcepts.size( )/penaltyDenominatorConstant);
```

In the pseudo-code of Table 1, the document's score (which is labeled "score") is increased by an amount equal to "addon" each time one of the top query concepts is found in the document. However, each time a term is found, the amount that "addon" adds to "score" is decreased. For the first one of the top query concepts found, "addon" is set equal to "startingScore." For subsequent terms, the amount of addon is decreased by an amount equal to "decrementConstant" multiplied by the number of top concepts that have already been considered for the document. (The variable "pos" keeps a running total of the number of concepts that have been considered.) If subtracting "pos*decrementConstant" from "startingScore" reduces "addon" below some minimum value, then "addon" is set to the minimum score, so that "addon" will have at least some minimum value regardless of the number of terms that have already been considered. The document's final score (the variable named "finalscore") is then calculated as indicated in the last two lines of Table 1. This calculation may penalize the document for having a number of concepts in excess of some pre-determined number. (What constitutes "too many" concepts is determined by the value of "penaltyDenominatorConstant".) The score calculated by the last two lines of Table 1 is "final" in the sense that it is the final score determined by the dynamic domain rank scorer. However, even such a "final" score could be affected subsequently by other scorers that implement other algorithms.

An alternative to using a "decrementConstant" to determine the amount to boost a document's score is to use of an indicator of how relevant the concept is to the query, if the approach used to determine top concepts is able to produce a relative score between the concepts. For example, highly correlated concepts would give a larger boost to the document score than less correlated concepts.

In addition to using this process to give boosts to document scores, a similar process may be used to penalize documents, either by giving penalties for top concepts that are not found in the document and/or penalties for concepts that are found in the document but are not in the set of top concepts.

In an alternative implementation, the frequency of appearance of the concepts in the documents is also used as a factor to determine the boost given to the document for a given top concept.

FIG. 6 shows an example process 600 that may be used to perform exact title match boosting.

At 602, the domain concepts are identified that appear in the query under consideration. At 604, the domain concepts are identified that appear in the title of one of the documents in the corpus. At 606, it is determined whether there is an exact match between the set of concepts that appear in the query and the set of concepts that appear in the title. If such an exact match exists, then the score of the document is boosted by some amount (at 608). (The amount by which to boost the score may be a configurable parameter, and the particular amount of the boost may be chosen based on the particular scoring scheme in place.) If there is not an exact match between the set of concepts in the query and the set of concepts in the title, then process 600 does not change the document's score (at 610). The process may then loop back to 604, to repeat the analysis for each document in the corpus of documents.

FIG. 7 shows an example process 700 of performing static domain ranking.

At 702, the number of concepts (from a given domain) that appear in a document is determined, and it is determined whether this number of concepts falls within an acceptable range. For example, as noted above, it might be considered normal for a medical document to contain the names of five to twenty different drugs, and thus the acceptable range of drug concepts for a document might be 5-20.

If the number of concepts in a document falls within an acceptable range, then the document's score may be increased (at 704). In one example, the score is increased by a fixed amount if the number of concepts falls within the acceptable range. In another example, there is a curve that describes how much the score is increased based on the actual number of concepts that appear in a document, where different numbers of concepts increase the score by different amounts.

If the number of concepts falls outside the acceptable range, then the score of the document is not increased (at 706). In one variation, the score may be decreased if the number of concepts falls outside of the acceptable range. (Or, in another variation, there may be different ranges in which the score increases, decreases, or remains the same, depending on which of the ranges the number of concepts falls into.)

Figure 8:
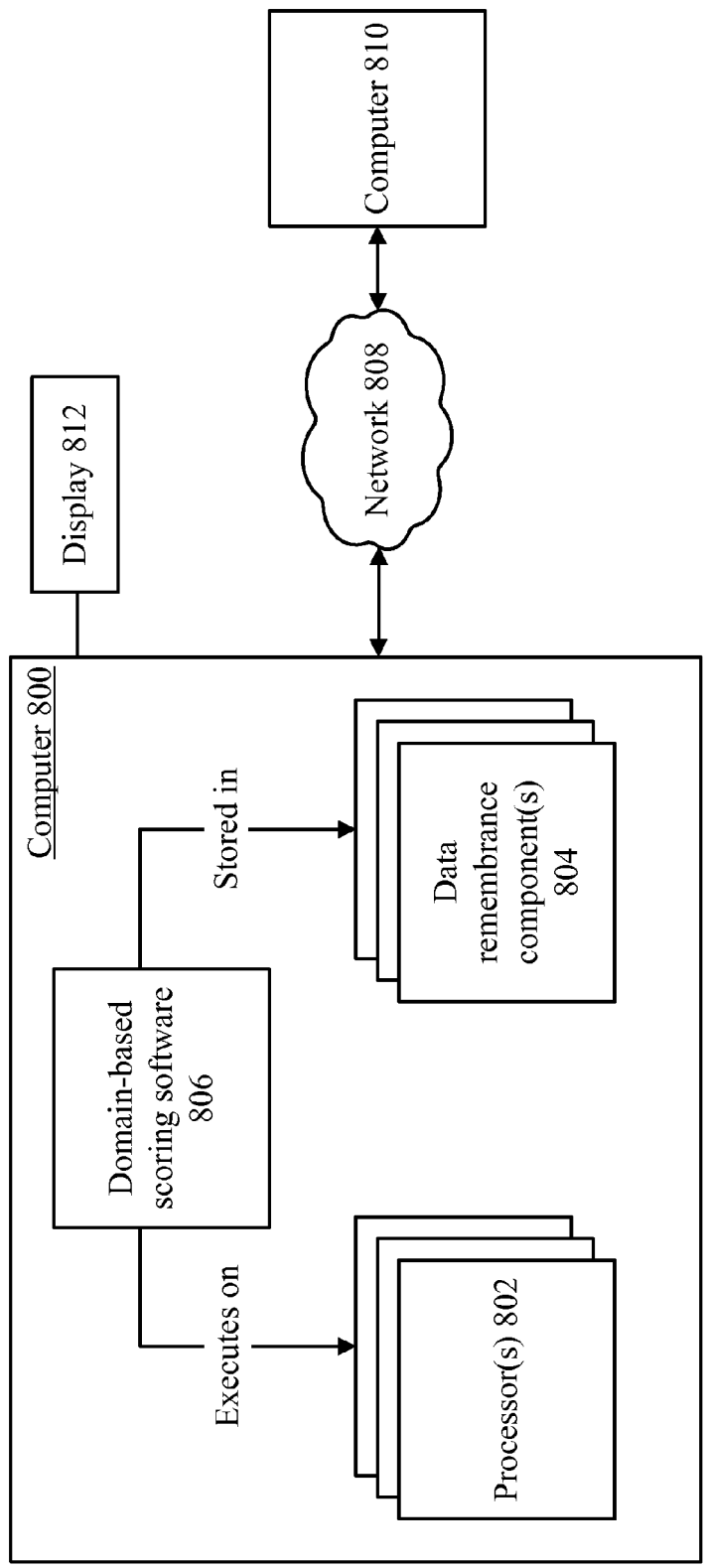
FIG. 8 is a block diagram of example components that may be used in connection with implementations of the subject matter described herein.

FIG. 8 shows an example environment in which aspects of the subject matter described herein may be deployed.

Computer 800 includes one or more processors 802 and one or more data remembrance components 804. Processor(s) 802 are typically microprocessors, such as those found in a personal desktop or laptop computer, a server, a handheld computer, or another kind of computing device. Data remembrance component(s) 804 are components that are capable of storing data for either the short or long term. Examples of data remembrance component(s) 804 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 800 may comprise, or be associated with, display 812, which may be a cathode ray tube (CRT) monitor, a liquid crystal display (LCD) monitor, or any other type of monitor.

Software may be stored in the data remembrance component(s) 804, and may execute on the one or more processor(s) 802. An example of such software is domain-based scoring software 806, which may implement some or all of the functionality described above in connection with FIGS. 1-7, although any type of software could be used. Software 806 may be implemented, for example, through one or more components, which may be components in a distributed system, separate files, separate functions, separate objects, separate lines of code, etc. A personal computer, server computer, or other kind of computer, in which a program is stored on hard disk, loaded into RAM, and executed on the computer's processor(s) typifies the scenario depicted in FIG. 8, although the subject matter described herein is not limited to this example.

The subject matter described herein can be implemented as software that is stored in one or more of the data remembrance component(s) 804 and that executes on one or more of the processor(s) 802. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 802) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 800 may be communicatively connected to one or more other devices through network 808. Computer 810, which may be similar in structure to computer 800, is an example of a device that can be connected to computer 800, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-readable storage device that stores executable instructions that, when executed by a computer, cause the computer to perform operations comprising:

receiving a query;

calculating scores for a plurality of documents obtained with respect to the received query by comparing terms in said query with terms in said documents;

calling a same first function implemented by each of a plurality of domain-based scorers of different types, to determine, without utilizing one or more documents of the plurality of documents, which of said domain-based scorers will contribute and which will not contribute to scoring of said documents in response to the calculation of said scores for the plurality of documents, wherein the same first function is used to determine whether the received query is too vague and will not be scored or is not too vaoue and will be scored, and wherein determining whether the received query is too vague or not too vague is based upon each domain-based scorer using its own set of first criteria for determining whether the received query is too vague or not too vague, each of said domain-based scorers calculating a domain-based score based on features of said documents or of said query that are specific to a substantive field of knowledge after the calculation of the scores for the plurality of documents, said each of said plurality of domain-based scorers implementing its own version of a same second function to calculate the domain-based score of said documents without obtaining said documents again with respect to the received query, wherein the same second function includes receiving document identifiers to identify said documents in a database and returning scores for said documents and using the returned scores as input into an aggregation formula, wherein each domain-based scorer uses its own set of second criteria within the aggregation formula, wherein said same second function of each of the plurality of domain-based scorers utilizes said documents which have already received scores based on the terms in said query to calculate the domain-based scores of said documents;

including, on a list, those domain-based scorers that indicate, through said same first function, that they will contribute to scoring of said documents;

using a configurable parameter selected based on a different scoring scheme by those ones of said domain-based scorers that are on said list to adjust said scores, whereby adjusted scores of said documents are created by combining the contributions from all of the said domain-based scorers;

creating a set of search results based on the adjusted scores of said documents; and presenting said search results to a user.

2. The computer-readable storage device of claim 1, wherein said operations further comprise:

identifying a number of concepts, in the at least one document, associated with the at least one term in the query; and increasing the domain-based score of the at least one document by a variable amount based on the number, wherein the variable amount decreases when the number is more and less than a predefined number.

3. The computer-readable storage device of claim 1, further comprising:

reducing the domain-based score of the at least one document based on the at least one document having an amount of concepts relevant to the query in excess of a predefined number.

4. The computer-readable storage device of claim 1, wherein said operations further comprise:

identifying a set of concepts associated with the at least one term in the query;

and either:

decreasing a domain-based score of the at least one document based on how many concepts in the set of concepts are not in the at least one document; or decreasing a domain-based score of the at least one document based on how many concepts in the at least one document are not in the set of concepts.

5. The computer-readable storage device of claim 1, further comprising:

identifying a first set of concepts in the query;

identifying a second set of concepts in a summary of the at least one document;

determining that the first set has a defined level of similarity to the second set; and based on the first set having the defined level of similarity to the second set, increasing a domain-based score of the at least one document.

6. The computer-readable storage device of claim 1, wherein a first one of the domain-based scorers evaluates the at least one document without regard to the query based on a determination that the query is vague with respect to domain based scoring of the at least one document for which the first score has been determined.

7. The computer-readable storage device of claim 1, further comprising:
   determining a number of concepts from a domain that appears in the at least one document;
   determining that the number falls within a range; and
   modifying a domain-based score of the at least one document based on the number falls within the range, wherein the domain-based score is increased on determining that the number falls within a first range, the domain-based score remains same on determining that the number falls within a second range, and the domain-based score is decreased on determining that the number falls within a third range.

8. The computer-readable storage device of claim 1, further comprising:
   determining a number of concepts from a domain that appears in the at least one document; and
   modifying a domain-based score of the at least one document by an amount that is based on the number.

9. The computer-readable storage device of claim 1, further comprising:
   determining that the at least one document has a concept, from a domain, that has a level of popularity across a group of documents in the corpus; and
   based on the concept being in the at least one document, modifying a domain-based score of the at least one document.

10. The computer-readable storage device of claim 1, wherein the operations further comprise:
    calling the same first function in each of the plurality of scorers to determine which of the plurality of scorers will form the set of domain-based scorers to produce the domain-based score for the at least one document, wherein each of the plurality of scorers implements its own version of the function.

11. A system that responds to a document search request, the system comprising:
    a memory; and
    a processor programmed to:
       receive a query;
       calculate scores for a plurality of documents obtained with respect to the received query by comparing terms in said query with terms in said documents;
       call a same first function implemented by each of a plurality of domain-based scorers of different types, to determine, without utilizing one or more documents of the plurality of documents, which of said domain-based scorers will contribute and which will not contribute to scoring of said documents in response to the calculation of said scores for the plurality of documents, wherein the same first function is used to determine whether the received query is too vague and will not be scored or is not too vague and will be scored, and wherein determining whether the received query is too vague or not too vague is based upon each domain-based scorer using its own set of first criteria for determining whether the received query is too vague or not too vague, each of said domain-based scorers calculating a domain-based score based on features of said documents or of said query that are specific to a substantive field of knowledge after the calculation of the scores for the plurality of documents, said each of said plurality of domain-based scorers implementing its own version of a same second function to calculate the domain-based score of said documents without obtaining said documents again with respect to the received query, wherein the same second function includes receiving document identifiers to identify said documents in a database and returning scores for said documents and using the returned scores as input into an aggregation formula, wherein each domain-based scorer uses its own set of second criteria within the aggregation formula, wherein said same second function of each of the plurality of domain-based scorers utilizes said documents which have already received scores based on the terms in said query to calculate the domain-based scores of said documents;
       include, on a list, those domain-based scorers that indicate, through said same first function, that they will contribute to scoring of said documents;
       use a configurable parameter selected based on a different scoring scheme by those ones of said domain-based scorers that are on said list to adjust said scores, whereby adjusted scores of said documents are created by combining the contributions from all of the said domain-based scorers;
       create a set of search results based on the adjusted scores of said documents; and
       present said search results to a user.

12. The system of claim 11, wherein each of the domain-based scorers that are on said list contributes a score for each of said documents, and wherein said acts further comprise:
    calculating said adjusted score for each document by calculating a product of: (a) a score for that document that is calculated by comparing terms in said query with terms in the document, and (b) the domain-based scores contributed by each of the domain-based scorers that are on said list.

13. The system of claim 11, wherein a first one of the domain-based scorers evaluates the documents without regard to the query based on a determination that the query is vague with respect to domain based scoring of the documents for which the scores have been determined.

14. The system of claim 11, wherein a first one of said plurality of domain-based scorers determines that a number of concepts from a domain that appear in a given one of said documents falls within a range, and contributes to a modification in score of said given one of said documents based on said number falling within said range.

15. The system of claim 11, wherein a first one of said plurality of domain-based scorers determines a number of concepts of a domain that appear in a given one of said documents and contributes to a modification in score of said given one of said documents, said increase being in an amount that is based on said number.

16. The system of claim 11, wherein a first one of said plurality of domain-based scorers determines that a given one of said documents has a concept that has a level of popularity across said documents, and, based on said concept being in said given one of said documents, contributes to a modification in score of said given one of said documents.

17. The system of claim 11, wherein each of said plurality of domain-based scorers exposes a callable function that, when called, provides an explanation describing a reason for which a final score has been assigned to a given one of said documents.

18. The system of claim 11, wherein a domain comprises a medical domain that includes concepts that describe either conditions of a human body or medical treatments of said human body.

19. A method of responding to a search query, the method comprising:
 using a processor to perform acts comprising:
  receiving a query;
  calculating scores for a plurality of documents obtained with respect to the received query by comparing terms in said query with terms in said documents;
  calling a same first function implemented by each of a plurality of domain-based scorers of different types, to determine, without utilizing one or more documents of the plurality of documents, which of said domain-based scorers will contribute and which will not contribute to scoring of said documents in response to the calculation of said scores for the plurality of documents, wherein the same first function is used to determine whether the received query is too vague and will not be scored or is not too vague and will be scored, and wherein determining whether the received query is too vague or not too vague is based upon each domain-based scorer using its own set of first criteria for determining whether the received query is too vague or not too vague, each of said domain-based scorers calculating a domain-based score based on features of said documents or of said query that are specific to a substantive field of knowledge after the calculation of the scores for the plurality of documents, said each of said plurality of domain-based scorers implementing its own version of a same second function to calculate the domain-based score of said documents without obtaining said documents again with respect to the received query, wherein the same second function includes receiving document identifiers to identify said documents in a database and returning scores for said documents and using the returned scores as input into an aggregation formula, wherein each domain-based scorer uses its own set of second criteria within the aggregation formula, wherein said same second function of each of the plurality of domain-based scorers utilizes said documents which have already received scores based on the terms in said query to calculate the domain-based scores of said documents;
  including, on a list, those domain-based scorers that indicate, through said same first function, that they will contribute to scoring of said documents;
  using a configurable parameter selected based on a different scoring scheme by those ones of said domain-based scorers that are on said list to adjust said scores, whereby adjusted scores of said documents are created by combining the contributions from all of the said domain-based scorers;
  creating a set of search results based on the adjusted scores of said documents; and
  presenting said search results to a user.

20. The method of claim 19, wherein each of the domain-based scorers that are on said list contributes a score for each of said documents, and wherein said acts further comprise:
 calculating said adjusted score for each document by calculating a product of: (a) a score for that document that is calculated by comparing terms in said query with terms in the document, and (b) the domain-based scores contributed by each of the domain-based scorers that are on said list.

* * * * *